US007819738B2

(12) United States Patent
Bozeman et al.

(10) Patent No.: US 7,819,738 B2
(45) Date of Patent: Oct. 26, 2010

(54) LOTTERY GAME BASED ON LETTER PUZZLES

(75) Inventors: Alan Kyle Bozeman, Alpharetta, GA (US); Stephen Gerard Penrice, Morristown, NJ (US)

(73) Assignee: Scientific Games International, Inc., Newark, DE (US)

( * ) Notice: Subject to any disclaimer, the term of this patent is extended or adjusted under 35 U.S.C. 154(b) by 465 days.

(21) Appl. No.: 11/088,167

(22) Filed: Mar. 23, 2005

(65) Prior Publication Data

US 2006/0046825 A1 Mar. 2, 2006

Related U.S. Application Data

(60) Provisional application No. 60/604,445, filed on Aug. 25, 2004.

(51) Int. Cl.
*G06F 17/00* (2006.01)
*G06F 19/00* (2006.01)

(52) U.S. Cl. .................................................... 463/17

(58) Field of Classification Search .................... 463/17
See application file for complete search history.

(56) References Cited

U.S. PATENT DOCUMENTS 5,112,050 A * 5/1992 Koza et al. .................... 463/17
5,158,293 A * 10/1992 Mullins ...................... 273/139
5,269,523 A * 12/1993 Boylan et al. ............ 273/138.1
5,451,052 A * 9/1995 Behm et al. ................. 273/139
5,613,679 A * 3/1997 Casa et al. ............... 273/138.1
5,788,573 A * 8/1998 Baerlocher et al. ............ 463/16
6,017,032 A 1/2000 Grippo et al.
6,080,062 A 6/2000 Olson
6,168,521 B1 1/2001 Luciano et al.
6,224,055 B1 * 5/2001 Walker et al. ............... 273/139
6,435,500 B2 * 8/2002 Gumina ...................... 273/139
6,497,408 B1 12/2002 Walker et al.
6,773,345 B2 8/2004 Walker et al.
6,889,978 B2 * 5/2005 Schaefer et al. ............. 273/139
7,112,135 B2 * 9/2006 Anderson et al. ............. 463/16
2006/0252488 A1 * 11/2006 Lalonde et al. ............... 463/17

OTHER PUBLICATIONS

See STIC Search.*
Chip Brown, Austin American-Statesman, May 28, 1998, Copyright 1998 The Austin American-Statesman, 2 Pages.

* cited by examiner

*Primary Examiner*—Dmitry Suhol
*Assistant Examiner*—Malina K Rustemeyer
(74) *Attorney, Agent, or Firm*—Dority & Manning, P.A.

(57) ABSTRACT

A system and method for a lottery game. The game includes a plurality of puzzles, where each puzzle is a concatenation of characters including letters, wherein some characters are missing from each puzzle. A player selects a set of characters from a predefined set of characters and if the select set of characters includes a solution for at least one puzzle, the player may receive a prize.

13 Claims, 22 Drawing Sheets

| | |
|---|---|
| Puzzle 1: | -ITTEN |
| Puzzle 2: | T-AT RIN-S A -ELL |
| Puzzle 3: | -LOSE -UT NO -I-AR |

FIG. 1

Prize Table

Puzzle 3: $5

Any 2 Puzzles: $20

All 3 Puzzles: $100

FIG. 4

Class 1 Letters:

C, D, F, G, H, P

Class 2 Letters:

B, J, K, M, Q, V, W, X, Y, Z

FIG. 5

Group 1 Puzzles

| Puzzle | Completed Puzzle | Solution |
|---|---|---|
| LI-ORI-E | LICORICE | C |
| RE- | RED | D |
| -ERN | FERN | F |
| -REEN | GREEN | G |
| -AT | HAT | H |
| A--L E | APPLE | P |
| -AN-ER | DANCER | C D |
| -A-E | FACE | C F |
| -ARLI- | GARLIC | C G |
| --EESE | CHEESE | C H |
| -E-AN | PECAN | C P |
| -A--O_IL | DAFFODIL | D F |
| -O- | DOG | D G |
| RA-IS- | RADISH | D H |
| S-I-E R | SPIDER | D P |
| -O- | FOG | F G |
| S-ERI-- | SHERIFF | F H |
| -RO-ESSOR | PROFESSOR | F P |
| -U- | HUG | G H |
| -RA-E | GRAPE | G P |
| ELE--ANT | ELEPHANT | H P |

FIG. 6

Group 2 Puzzles

| Puzzle | Completed Puzzle | Solution |
|---|---|---|
| TU-A | TUBA | B |
| -ET | JET | J |
| -ITE | KITE | K |
| LE-ON | LEMON | M |
| S-UIRREL | SQUIRREL | Q |
| OLI-E | OLIVE | V |
| -ALNUT | WALNUT | W |
| TA-I | TAXI | X |
| E-E | EYE | Y |
| PI--A | PIZZA | Z |

FIG. 7

Type 1

Puzzle 1: TU_A (Solution:“B” for “TUBA”)

Puzzle 2: _ET (Solution: “J” for “JET”)

FIG. 8

Type 2

Puzzle 1: LI_ORI_E (Solution: “C” for “LICORICE” )

Puzzle 2: TU_A (Solution: “B” for “TUBA”)

FIG. 9

Type 3

Puzzle 1: _AN_ER (Solution: “CD” for “DANCER”)

Puzzle 2: TU_A (Solution: “B” for “TUBA”)

FIG. 10

Type 4

Puzzle 1: LI_ORI_E (Solution: “C” for “LICORICE”)

Puzzle 2: _A__O_IL (Solution: “DF” for “DAFFODIL”)

FIG. 11

Prize Table

Puzzle 2: $5
Puzzle 1 and Puzzle 2: $100

$100 WINNER

| Selection | Contribution to "Puzzle 2 only" fund | Contribution to "Both Puzzles" fund |
|---|---|---|
| 3 letters from Class 1 | $0.17 | $1.16 |
| 2 letters from Class 1, 1 letter from Class 2 | $0.42 | $0.92 |
| 2 letters from Class 2 | $0.74 | $0.60 |
| 3 letters from Class 2 | $1.14 | $0.19 |

Group 1 Puzzles

| Puzzle | Completed Puzzle | Solution |
| --- | --- | --- |
| TU- A, RA-- IT, -OOT | TUBA, RABBIT, BOOT | B |
| - ET, - EANS | JET, JEANS | J |
| - ITE, - ITTEN | KITE, KITTEN | K |
| LE- ON, OAT- EAL | LEMON, OATMEAL | M |
| S- UIRREL | SQUIRREL | Q |
| OLI- E, - IOLET | OLIVE , VIOLET | V |
| - ALNUT, - ALRUS | WALNUT, WALRUS | W |
| TA-I | TAXI | X |
| E-E | EYE | Y |
| PI--A | PIZZA | Z |

FIG. 18

1. B, J 0.03186%

2. B, K 0.03186%

.

.

.

360. HP, P 0.38658%

FIG. 19

Outcomes corresponding to "B, J"

TU - A ("TUBA")
- ET ("JET")
Set 1

TU - A ("TUBA")
- EANS ("JEANS")
Set 2

- OOT ("BOOT")
- ET( "JET")
Set 3

- OOT ("BOOT")
- EANS ("JEANS")
Set 4

RA -- IT("RABBIT")
- ET ("JET")
Set 5

RA -- IT ("RABBIT")
- EANS ("JEANS")
SET 6

FIG. 20 specifications number of letters: 5, number of puzzles: 4 given letters: A, E, I, L, N, O, R, S, T, U matrix 1: B, C, D, G, H, M, P, Y matrix 2: F, J, K, Q, V, W, X, Z prize table: 2 puzzles:$10, 3 puzzles: $50, 4 puzzles: $500 input: permutation 1: $X_1X_2X_3X_4X_5$ permutation 2: $Y_1Y_2Y_3Y_4Y_5$

| | puzzle 1 | puzzle 2 | puzzle 3 | puzzle 4 | probabilities |
|---|---|---|---|---|---|
| function 1: | $X_1$ | $X_2X_3$ | $X_4X_5$ | $X_1X_2X_3$ | 0.119% |
| function 2: | $X_1$ | $X_2Y_1$ | $X_3Y_2$ | $X_1X_2X_3$ | 43.994% |
| function 3: | $X_1$ | $Y_1$ | $X_1X_2X_3$ | $X_2X_3X_4$ | 12.454% |
| function 4: | $Y_1$ | $X_1Y_2$ | $X_2Y_1$ | $X_1Y_3$ | 35.832% |
| function 5: | $Y_1$ | $Y_2$ | $X_1Y_3$ | $X_1Y_4$ | 5.677% |
| function 6: | $Y_1$ | $Y_2$ | $Y_3$ | $Y_4$ | 1.924% |

FIG. 21 result of 1st phase of draw: GDBYP KQFJZ result of 2nd phase of draw: function 2.

function 2 maps permutations GDBYP KQFJK to:

outcome:

| | | | |
|---|---|---|---|
| puzzle 1: G | puzzle 2: DK | puzzle 3:BQ | puzzle 4:GDB |

embodiment:

| | | | |
|---|---|---|---|
| puzzle 1: GREEN | puzzle 2: DESK | puzzle 3: BANQUET | puzzle 4: BADGE |

FIG. 22

| | | | | | | | |
|---|---|---|---|---|---|---|---|
| B | TUBA | CDM | COMEDIAN | DMY | MELODY | HV | SHOVEL |
| BC | BISCUIT | CDP | POSTCARD | DP | LEOPARD | HW | WHALE |
| BCD | CORNBREAD | CDY | COURTYARD | DPY | EYEDROPS | HX | HOUSTON, TEXAS |
| BCG | CABBAGE | CF | COFFEE | DQ | SQUID | HY | HONEY |
| BCH | BENCH | CG | COUGAR | DV | DOVE | HZ | HORIZON |
| BCM | COMB | CGH | STAGECOACH | DW | LAW AND ORDER | J | JEANS |
| BCP | BUTTERCUP | CGM | MAGICIAN | DX | TUXEDO | JM | JAM |
| BCY | BICYCLE | CGP | STAGE PRESENCE | DY | DAISY | JP | JALAPENO |
| BD | BLUEBIRD | CGY | GROCERY STORE | DZ | LIZARD | JY | JELLY |
| BDG | BADGE | CH | CHOCOLATE | F | FLUTE | K | KITTEN |
| BDH | HEADBAND | CHM | CHAMELEON | FG | GOLF | KM | MILK |
| BDM | BADMINTON | CHP | PEACH | FH | SHERIFF | KP | PARAKEET |
| BDP | BEDSPREAD | CHY | CHERRY | FP | PROFESSOR | KY | KEY |
| BDY | BARNYARD | CJ | JUICE | FY | FIREFLY | M | LEMON |
| BF | FOOTBALL | CK | CRACKER | G | GREEN | MF | MUFFIN |
| BG | BEAGLE | CM | CINNAMON | GH | ENOUGH IS ENOUGH | MP | UMPIRE |
| BGH | NEIGHBOR | CMP | POLICEMAN | GHM | MOONLIGHT | MPY | PLAYROOM |
| BGM | BUBBLE GUM | CMY | MOTORCYCLE | GHP | SPAGHETTI | MQ | MOSQUITO |
| BGP | BAGPIPES | CP | APRICOT | GHY | YOUNG AT HEART | MV | MOVIE |
| BGY | BIOLOGY | CPY | CYPRESS | GJ | JUG | MW | WATERMELON |
| BH | BATHROBE | CQ | CROQUET | GK | KANGAROO | MX | MIXER |
| BHM | THIMBLE | CV | CARNIVAL | GM | NUTMEG | MY | MAYONNAISE |
| BHP | PAINTBRUSH | CW | CLOWN | GMP | PILGRIM | MZ | MOISTURIZER |
| BHY | HONEYBEE | CX | EXOTIC CRUISE | GMY | GYMNAST | P | PIANO |
| BJ | BANJO | CY | COYOTE | GP | GRAPE | PQ | QUINTUPLETS |
| BK | BOOK | CZ | ZINC | GPY | EGYPT | PV | ENVELOPE |
| BM | TROMBONE | D | SALAD | GQ | SQUIRT GUN | PW | WASP |
| BMP | PLUMBER | DF | DAFFODIL | GV | GLOVE | PX | SEXTUPLETS |
| BMY | STATUS SYMBOL | DG | GOLD | GW | WIG | PY | SYRUP |
| BP | PEBBLE | DGH | DAUGHTER | GX | STRONG AS AN OX | PZ | PIZZA |
| BPY | RASPBERRY | DGM | MARIGOLD | GY | GRAY | Q | SQUIRREL |
| BQ | BANQUET | DGP | PUDDING | GZ | LOZENGE | QY | STAR QUALITY |
| BV | BEAVER | DGY | STAND YOUR GROUND | H | SHOE | V | OLIVE |
| BW | BOWL | DH | RADISH | HJ | TROJAN HORSE | VY | IVY |
| BX | BOX | DHM | THUNDERSTORM | HK | SHARK | W | WALNUT |
| BY | RUBY | DHP | DOLPHIN | HM | HAMMER | WY | YELLOW |
| BZ | ZEBRA | DHY | THURSDAY | HMP | SHAMPOO | X | TAXI |
| C | LICORICE | DJ | JUDO | HMY | HONEYMOON | XY | LUXURY LINER |
| CD | ANACONDA | DK | DESK | HP | ELEPHANT | Y | LILY |
| CDG | SITTING ON CLOUD NINE | DM | MUSTARD | HPY | PYTHON | YZ | LAZY SUSAN |
| CDH | ORCHID | DMP | DIMPLE | HQ | SQUASH | Z | ZOO |

FIG. 23

Puzzle 1: LI-ORI-E

Puzzle 2: -ITTEN

Puzzle 3: SITTIN- ON -LOU- NINE

Puzzle 4: -AU--TER

Puzzle 1: LICORICE

Puzzle 2: KITTEN

Puzzle 3: SITTING ON CLOUD NINE

Puzzle 4: DAUGHTER

FIG. 24

Puzzle 1: [][][][][][][][]

Puzzle 2: [][][][][][]

Puzzle 3: [][][][][][][] [][] [][][][][] [][][][]

Puzzle 4: [][][][][][][][]

Puzzle 1: LICORICE

Puzzle 2: KITTEN

Puzzle 3: SITTING ON CLOUD NINE

Puzzle 4: DAUGHTER

FIG. 25

| | |
|---|---|
| $172.5w_4$ | 3 Class 1 letters |
| $22.5w_1 + 60w_2 + 85w_3 + 10w_4$ | 2 Class 1 letters and 1 Class 2 letter |
| $140w_1 + 125w_2 + 75w_3$ | 1 Class 1 letter and 2 Class 2 letters |
| $352.5w_1 + 45w_2 + 112.5w_3$ | 3 Class 2 letters |

FIG. 28

$$0 \leq w_i \leq 1, \ 1 \leq i \leq 4$$

$$90w_1 + 60w_2 + 150w_3 + 60w_4 = 1$$

$$172.5w_4 = R$$

$$22.5w_1 + 60w_2 + 85w_3 + 10w_4 = R$$

$$140w_1 + 125w_2 + 75w_3 = R$$

$$352.5w_1 + 45w_2 + 112.5w_3 = R$$

FIG. 29

Total Number of Outcomes function 1: 6,720 outcomes function 2: 18.816 outcomes function 3: 13,440 outcomes function 4: 18,816 outcomes function 5: 13,440 outcomes function 6: 1,680 outcomes

FIG. 30

BCDFJ winning outcomes

| | $10 | $50 | $500 |
|---|---|---|---|
| function 1 outcomes | 360 | 0 | 0 |
| function 2 outcomes | 1,080 | 144 | 12 |
| function 3 outcomes | 1,440 | 60 | 0 |
| function 4 outcomes | 2,232 | 144 | 0 |
| function 5 outcomes | 1,380 | 0 | 0 |
| function 6 outcomes | 360 | 0 | 0 |

FIG. 31

Returns for player selections $$8.75P_1 + 0.892857P_2 + 2.321429P_3$$

$$1.571429P_1 + 0.892857P_2 + 1.491071P_3 + 0.3125P_4$$

$$0.267857P_1 + 0.637755P_2 + 0.647321P_3 + 0.784439P_4 + 0.513393P_5 + 1.071429P_6$$

$$0.153061P_2 + 0.46875P_3 + 1.151148P_4 + 1.383929P_5 + 3.928571P_5$$

$$0.3125P_3 + 0.803571P_4 + 2.419643P_5 + 11.85714P_6$$

$$1.785714P_5 + 30.71429P_6$$

FIG. 32

$$0 \leq P_i \leq 1,\ 1 \leq i \leq 6$$

$$P_1 + P_2 + P_3 + P_4 + P_5 + P_6 = 1$$

$$8.75P_1 + 0.892857P_2 + 2.321429P_3 = R$$

$$1.571429P_1 + 0.892857P_2 + 1.491071P_3 + 0.3125P_4 = R$$

$$0.267857P_1 + 0.637755P_2 + 0.647321P_3 + 0.784439P_4 + 0.513393P_5 + 1.071429P_6 = R$$

$$0.153061P_2 + 0.46875P_3 + 1.151148P_4 + 1.383929P_5 + 3.928571P_5 = R$$

$$0.3125P_3 + 0.803571P_4 + 2.419643P_5 + 11.85714P_6 = R$$

$$1.785714P_5 + 30.71429P_6 = R$$

FIG. 33

LOTTERY GAME BASED ON LETTER PUZZLES

CROSS-REFERENCE TO RELATED APPLICATION

This application relates to and claims the benefit of U.S. Provisional Patent Application No. 60/604,445, entitled "Lottery Game Based on Letter Puzzles," filed on Aug. 25, 2004.

BACKGROUND OF THE INVENTION

1. Field of the Invention

The invention generally relates to lottery systems for conducting lottery games and casino gaming systems. More particularly, the present invention relates to lottery games that use letter-based puzzles.

2. Description of the Related Art

Many governments and/or gaming organizations sponsor wagering games known as lotteries. A typical lottery game entails players selecting permutations or combinations of numbers. This is followed by a "draw," wherein the lottery randomly selects a combination or permutation of numbers, typically drawn from a series of numbered balls. Prizes are awarded based on the number of matches between a player's selected numbers and the drawn numbers. Such are the well-publicized, multi-million-dollar-jackpot lotteries that are popular throughout the world.

Lotteries have become an important source of income to governments to alleviate the financial burden for education and other governmental programs. As lotteries have become more ubiquitous and governments have grown more dependent on them, it has become a challenge to sustain public interest. One approach to invigorating lottery sales is to expand game content beyond traditional combination/permutation games: fresh, sophisticated, entertaining games. New games may help keep current players as well as draw new players.

In the pursuit of new lottery games, certain goals must be met. The lottery must be able to control the payout to the player. Ideally, the payout should be the same for all players regardless of skill. Short of that, the expected payout should fall within a range, i.e., there is an acceptable lower and upper bound to the expected player payout.

One potential area for new lottery games is word games. However, it is problematic to incorporate the characteristics of words into a lottery game in a meaningful way. Language is complex and idiosyncratic and letters do not occur uniformly in words (e.g. the letter 'E' occurs in more words than 'Q'). Such erratic characteristics do not easily lend themselves to lottery games in which probabilities and payouts must be tightly controlled.

SUMMARY OF THE INVENTION

The current invention meets the challenge of combining a word with a wagering game. It is a letter game in the sense that the player completes puzzles by providing letters. It is also a wagering game where the player is rewarded for certain outcomes and where the payout to the players can be controlled.

In one aspect, the invention is a method for playing a lottery game including the steps of accepting an entry comprising a set of characters, such as letters, and drawing a set of letter puzzles, where a letter puzzle is defined as any puzzle for which the solution is a set of letters. An entry solves a puzzle if the entry contains the solution to that puzzle. An entry may win depending on which and/or how many puzzles his entry solves. The game can require that two or more puzzles must be solved in order to win and receive a payout.

In another aspect, the invention is a method for playing a lottery game including the steps of placing a game entry comprising a plurality of characters at a game station, comparing the game entry against each in a set of puzzles, and the player possibly receiving a prize depending on which and/or how many puzzles his entry solves.

In another aspect, the invention is a method for setting up a lottery game, comprising the steps of defining a plurality of puzzles, grouping and weighting puzzles and awarding prizes in such a way as to ensure a certain payout to the players.

Other objects, features, and advantages will become apparent after review of the hereinafter set forth Brief Description of the Drawings, Detailed Description of the Invention, and the Claims.

BRIEF DESCRIPTION OF THE DRAWINGS

FIG. 1 is a list of three examples of a puzzle game of the present invention.

FIG. 4 is a prize table.

FIG. 5 illustrates a division of letters into two classes.

FIG. 6 is an example of a group of puzzles.

FIG. 7 is another example of a group puzzles.

FIGS. 8-11 are examples of game outcomes.

FIG. 18 illustrates solutions and groups of puzzles each solution can satisfy.

FIG. 19 illustrates probabilities of outcomes of one embodiment.

FIG. 20 illustrates different sets of puzzles for a particular solution.

FIG. 21 is a summary of one embodiment of the invention.

FIG. 22 is a sample draw for the embodiment of FIG. 21.

FIG. 23 illustrates embodiments of solutions for FIG. 22.

FIG. 24 is a sample display of a puzzle.

FIG. 25 is a sample display of the puzzle of FIG. 24.

FIG. 28 are the returns for the various player selections expressed as linear combinations of weights on the outcomes.

FIG. 29 is a system of constraints for the weights on the outcomes and overall return on a game.

FIG. 30 are the number of possible outcomes for a each of a set of functions.

FIG. 31 is a table that indicates the number of possible outcomes for each of a set of functions that yield a particular prize given the player selection BCDFJ.

FIG. 32 are the returns for the various player selections expressed as linear combinations of weights on functions used in the draw.

FIG. 33 is a system of constraints for the weights on functions used in the draw and the overall return on a game.

DETAILED DESCRIPTION OF THE INVENTION

The current invention is a letter-based lottery game. In one embodiment, a player selects letters from the alphabet, and a drawing is conducted in a manner similar to a traditional lottery game. Depending on how the player's selection compares with the outcome of the draw, the player may be awarded a prize.

Generally, a draw in a lottery game comprises equally likely outcomes. This approach is problematic for a letter-based game that incorporates words and language because letters in the English alphabet are not distributed equally among words. Some letters, such as "E," occur frequently whereas other letters, such as "X," occur infrequently. More significantly, letters combine differently. For example, more words contain both the letters "E" and "S" than contain both "J" and "Q." To accommodate the uneven nature of language, the current invention allows outcomes to occur with different probabilities. More precisely, the outcomes for this lottery game can be described by a probability-distribution. Associated with each outcome is a probability. The sum of the probabilities is 1, which indicates that one and only one outcome will occur from the set of possible outcomes. In effect, the outcomes are "weighted." It will be shown that with this approach the expected payout for a letter-based game is the same for all players, or at least falls within an acceptable range. It is not required that the player have any knowledge of this weighting of outcomes. His expected return will be the same, or fall within some range, regardless of his selection.

An outcome for the current invention comprises one or more "letter puzzles." A letter puzzle may be defined as any puzzle for which a set of letters is a solution. A letter puzzle may be a be word, or combination of words such as a phrase, a sentence, or a paragraph, or combination thereof, for which all or some of the letters are indicated as "missing." For example, the character string "-RETT- AS A -I-TURE" is the phrase "PRETTY AS A PICTURE" with several letters replaced by dashes. "-RETT- AS A -I-TURE" is a letter puzzle for which the solution is the set "CPY", as this set comprises the missing letters. Note that this solution allows a single letter to be used as many times as needed. (P occurs twice in "PRETTY AS A PICTURE"). Alternatively, it may be required that a solution repeat a letter as many times as the letter occurs in the puzzle. In that case, "CPPY" would be the solution to "-RETT- AS A -I-TURE." Unless indicated otherwise, we will assume that a letter can be used as many times as needed.

Figure 2:
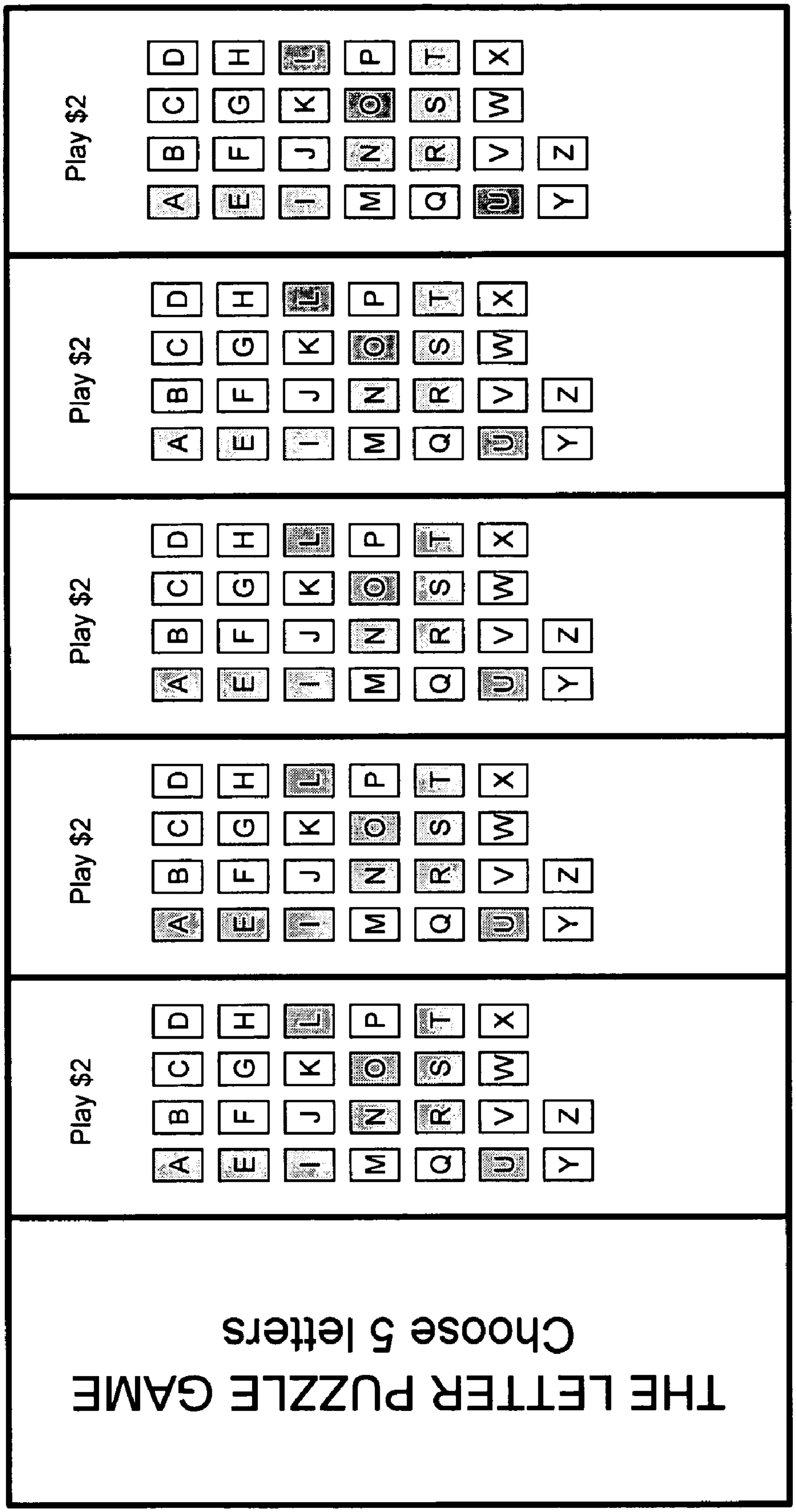
FIG. 2 is one embodiment of a playslip.
Figure 3:
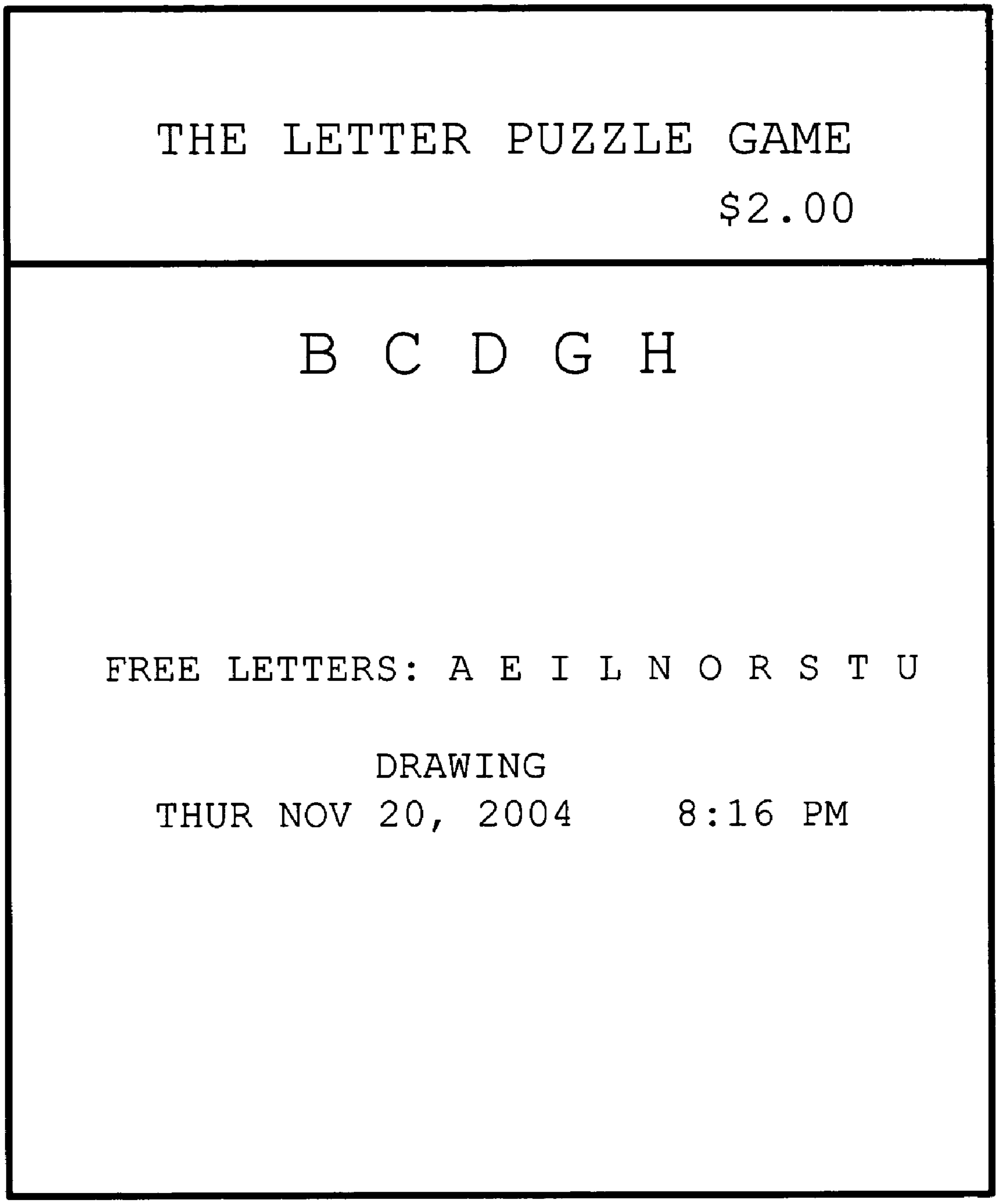
FIG. 3 is an exemplary game ticket.

FIG. 1 is an example of an outcome comprising three puzzles. Moreover, an order is assigned to the puzzles. Puzzle 1 is "-ITTEN", the solution to which is "K" ("KITTEN"). Puzzle 2 is "T-AT RIN-S A -ELL", the solution to which is "BGH" ("THAT RINGS A BELL"). Puzzle 3 is "-LOSE -UT NO -I-AR", the solution to which is "BCG" ("CLOSE BUT NO CIGAR"). The general sequence of events for playing the game of the current invention is similar to a traditional lottery game. Instead of a set of numbers, the player selects a set of letters. The player may make his selection with a playslip as shown in FIG. 2. Alternatively, the selection may be an oral transaction or communicated electronically. The letters available to the player may be the entire alphabet or a subset. On the playslip in FIG. 2, the letters A, E, I, L, N, O, R, S, T, U are shaded to exclude them from player selection. They serve as place holders on the playslip to orient the player. The player pays a fee to participate in the game and receives a ticket as shown in FIG. 3 to document the selection(s).

The draw comprises a selection by the lottery or gaming organization of a set of puzzles, as in FIG. 1. The outcome for a draw is a set of puzzles. Depending on the implementation, the puzzles may be drawn individually or in pre-assigned groups. The universe of possible outcomes could consist of "groups" of puzzles with each group being assigned a probability.

As with a traditional lottery game, the draw would occur at a designated time, or event. For example, the draw could be part of a daily televised event. The "daily puzzles" would be displayed along with the results of the other daily games. Alternatively, the game could be a monitor game, conducted at regular intervals throughout the day and displayed on monitors, similar to Keno.

Once the puzzles have been revealed, the player compares his selection with the drawn puzzles. He "solves" a puzzle if his selection contains the solution to that puzzle. For example, suppose the player's selection is as in FIG. 3, "BCDGH," and the draw is as described in FIG. 1. The player's selection "solves" Puzzles 2 and 3 as his selection contains the solutions "BGH" and "BCG." The player is awarded a prize based on which, and/or how many puzzles he solves. FIG. 4 illustrates a prize table. If a player solves only Puzzle 3, he wins $5. If he solves exactly two puzzles, he wins $20. If he solves all 3 he wins $100. In the event the player interprets a puzzle differently from the lottery (e.g. "MITTEN" instead of "KITTEN"), the lottery's interpretation prevails. If a player prefers, he can simply have a retailer scan his ticket to determine if he is a winner rather than determining the outcome himself.

FIGS. 5-21 describe an embodiment of this invention. The wager is $2. The letters A, E, I, L, N, O, R, S, T, U are given to the player. These letters comprise the vowels and some frequently occurring consonants. The player selects from the remaining letters. The remaining letters are divided into 2 classes as illustrated in FIG. 5. Organizing the letters into two classes provides the flexibility to handle letters differently. Roughly speaking, the more unwieldy letters, such as "Q" and "X," are in Class 2.

In addition to organizing letters into classes, puzzles are organized into groups. FIG. 6 illustrates an exemplary Group 1 with 21 puzzles. For each letter in Class 1, there is a corresponding puzzle in Group 1 such that that individual letter is the solution. For example, the letter "F" is in Class 1. There is a corresponding puzzle in Group 1: -ERN the solution to which is "F" ("FERN"). Also, for each combination of two letters from Class 1 there is a puzzle in Group 1 for which that combination is the solution. For example, for the two letters "D" and "F," there is the puzzle -A--O-IL ("DAFFODIL").

FIG. 7 illustrates another group, Group 2, with 10 puzzles. Similar to Group 1, for each letter in Class 2 there is a puzzle in Group 2 such that that individual letter is the solution. For example, the letter "V" is the solution to OLI-E ("OLIVE"). However, unlike Group 1, there are no puzzles in Group 2 for which the solution is a combination of letters.

An outcome for this embodiment will be defined to be a set of 2 puzzles. A plurality of sets of 2 puzzles will be determined and each of these sets assigned a probability. Individual puzzles will not be assigned probabilities. Instead, sets of 2 will be worked out in advance. The draw will consist of selecting exactly one of these sets based on the assigned probabilities.

For this embodiment, the outcomes comprise 4 types of sets of 2 puzzles. The first type is illustrated in FIG. 8. Type 1 outcomes consist of two distinct puzzles from Group 2. Furthermore, the outcomes are distinguished by order, Puzzles 1 and 2. Recall that each puzzle in Group 2 is such that its solution is an individual letter from Class 2. In this example, Puzzle 1 is "TU-A" (solution: "B" for "TUBA") and Puzzle 2 is "-ET" (solution: "J" for "JET"). The number of outcomes of Type 1 is 90 (10×9, the number of permutations of 10 objects taken 2 at a time).

A Type 2 outcome is illustrated in FIG. 9. Puzzle 1 is from Group 1 and such that the solution is an individual letter from Class 1. Puzzle 2 is from Group 2. In this example, Puzzle 1 is "LI-ORI-E" (solution: "C" for "LICORICE") and Puzzle 2 is "TU-A" (solution: "B" for "TUBA"). The number of outcomes of Type 2 is 60 (6×10, the number of acceptable puzzles in Group 1×the number of puzzles in Group 2).

A Type 3 outcome is illustrated in FIG. 10. Puzzle 1 is from Group 1 and such that the solution is a combination of two letters from Class 1. Puzzle 2 is from Group 2. In this example, Puzzle 1 is "-AN-ER" (solution: "CD" for "DANCER") and Puzzle 2 is "TU-A" (solution: "B" for "TUBA"). The number of outcomes of Type 3 is 150 (15×10, the number of acceptable puzzles in Group 1×the number of puzzles in Group 2).

A Type 4 outcome is illustrated in FIG. 11. Puzzle 1 is from Group 1 and such that the solution is an individual letter from Class 1. Puzzle 2 is also from Group 1 and such that the solution is a combination of two letters from Class 1. Also, it is required that the solutions do not overlap. In this example, Puzzle 1 is "LI-ORI-E" (solution: "C" for "LICORICE") and Puzzle 2 is "-A--O-IL" (solution: "DF" for "DAFFODIL"). FIG. 11 illustrates that the solution to Puzzle 1 is "C" ("LICORICE") and the solution to Puzzle 2 is "DF" ("DAFFODIL"). The number of outcomes of Type 4 is 60 (6×10, the number of letters in Class 1×the number of combinations of 2 out the remaining 5 letters).

Figures 12, 14:
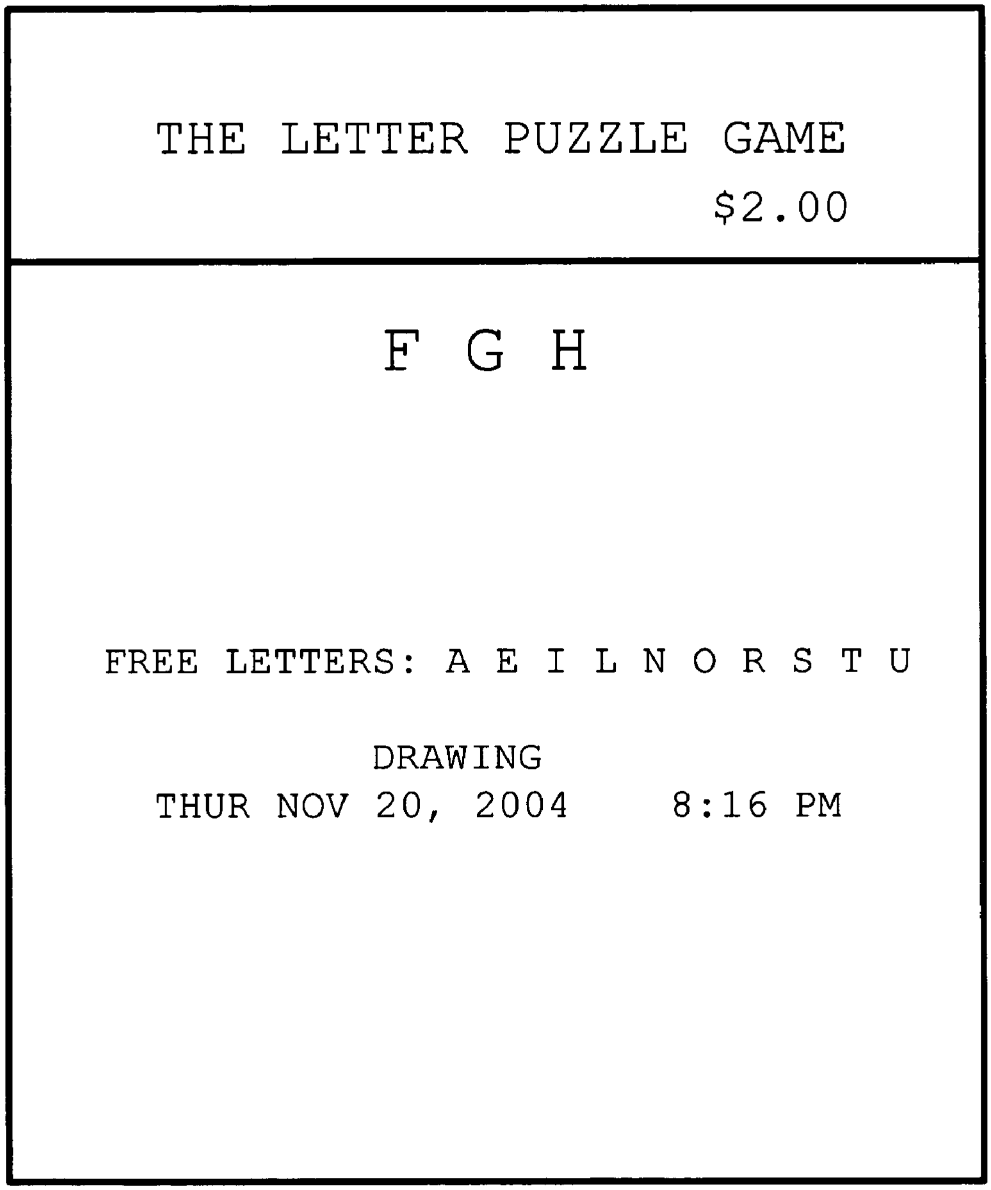
FIG. 12 illustrates a prize table.
FIG. 14 is another embodiment of a game ticket.

The 4 Types comprise 360 individual outcomes (90+60+150+60). To complete this embodiment, it remains to set price, a prize table and assign the outcomes a probability distribution. FIG. 12 illustrates a prize table for a $2 price point. The player wins $5 if his letters contain the solution to Puzzle 2. He wins $100 for solving both Puzzle 1 and Puzzle 2.

Four different types comprising 360 distinct outcomes for this embodiment have been determined, each consisting of a set of 2 puzzles. It remains to assign a probability distribution for these outcomes. Each outcome will be assigned a weight and will be drawn in proportion to that weight. It is generally desirable, and in some cases a legal requirement, that the return for a lottery game be independent of player skill. Therefore, the probability distribution should be such that the return is the same for all player selections. Such a probability distribution can be derived using linear algebra.

The probability distribution is derived as follows: As there are 4 different types of outcomes (90, 60, 150, and 60 outcomes of Types 1, 2, 3, and 4), 4 different weights will be determined: $w_1$, $w_2$, $w_3$, and $w_4$ corresponding to the 4 different types of outcomes. Each of the 360 outcomes will be assigned the weight of its corresponding type and the sum of the weights for the 360 outcomes will be 1, i.e. $90w_1+60w_2+150w_3+60w_4=1$ If $w_1$, $w_2$, $w_3$, and $w_4$ are the weights for the 4 different types of outcomes then the return for any player selection can be expressed as a linear combination of $w_1$, $w_2$, $w_3$, and $w_4$. For example, consider the player selection CDM. There are only two different possible prize amounts the player can win: $5 and $100. There are exactly 9 Type 1 outcomes for which CDM wins $5, exactly 4 Type 2 outcomes, exactly 15 Type 3 outcomes, and exactly 4 Type 4 outcomes. Analogously, there are 0 Type 1 outcomes that win $100, 2 Type 2 outcomes, 1 type 3 outcomes, and 0 Type 4 outcomes. As the wager is $2, the return is $$([9w_1+4w_2+14w_3+4w_4]\times 5+[0w_1+2w_2+1w_3+0w_4]\times 100)/2=22.5w_1+60w_2+85w_3+10w_4.$$

It is clear that returns for player selections equivalent to CDM are expressed by the same linear combination. That is, as CDM comprises 2 letters from Class 1 and 1 letter from Class 2, the return for any other player selection comprising 2 letters from Class 1 and 1 letter from Class 2 would be derived similarly, e.g FGQ, HPW, CGJ, etc. would be expressed by the same linear combination. In general, to express the return for a player selection as a linear combination of $w_1$, $w_2$, $w_3$, and $w_4$, there are 4 cases to consider: 3 Class 1 letters, 2 Class 1 letters and 1 Class 2 letter, 1 Class 1 letter and 2 Class 2 letters, and 3 Class 2 letters. We derived the linear combination for the case where there are 2 Class 1 letters and 1 Class 2 letter. The other 3 linear combinations are derived similarly. The linear combinations for the 4 different cases are displayed in FIG. 33.

As discussed, it is desirable that the weights be determined such that the returns for each of the 4 cases is the same. In short, it is desirable to find $w_1$, $w_2$, $w_3$, $w_4$ and a number R subject to the constraints summarized in FIG. 34. Using techniques of linear algebra a solution to this set of constraints is $w_1=0.03186\%$, $w_2=0.26585\%$, $w_3=0.38658\%$, $w_4=0.38658\%$, and R=66.7%. That is, if each of the 360 outcomes is assigned the corresponding one of these weights, the return for every player selection is 66.7%. This return is reasonable for a lottery game as returns can range from below 50% to more than 70%. If this return were not satisfactory the prizes could be rescaled and the weights and return recomputed. (For example, dividing all of the prizes by 2 would reduce the expected return by half.)

Figure 13:
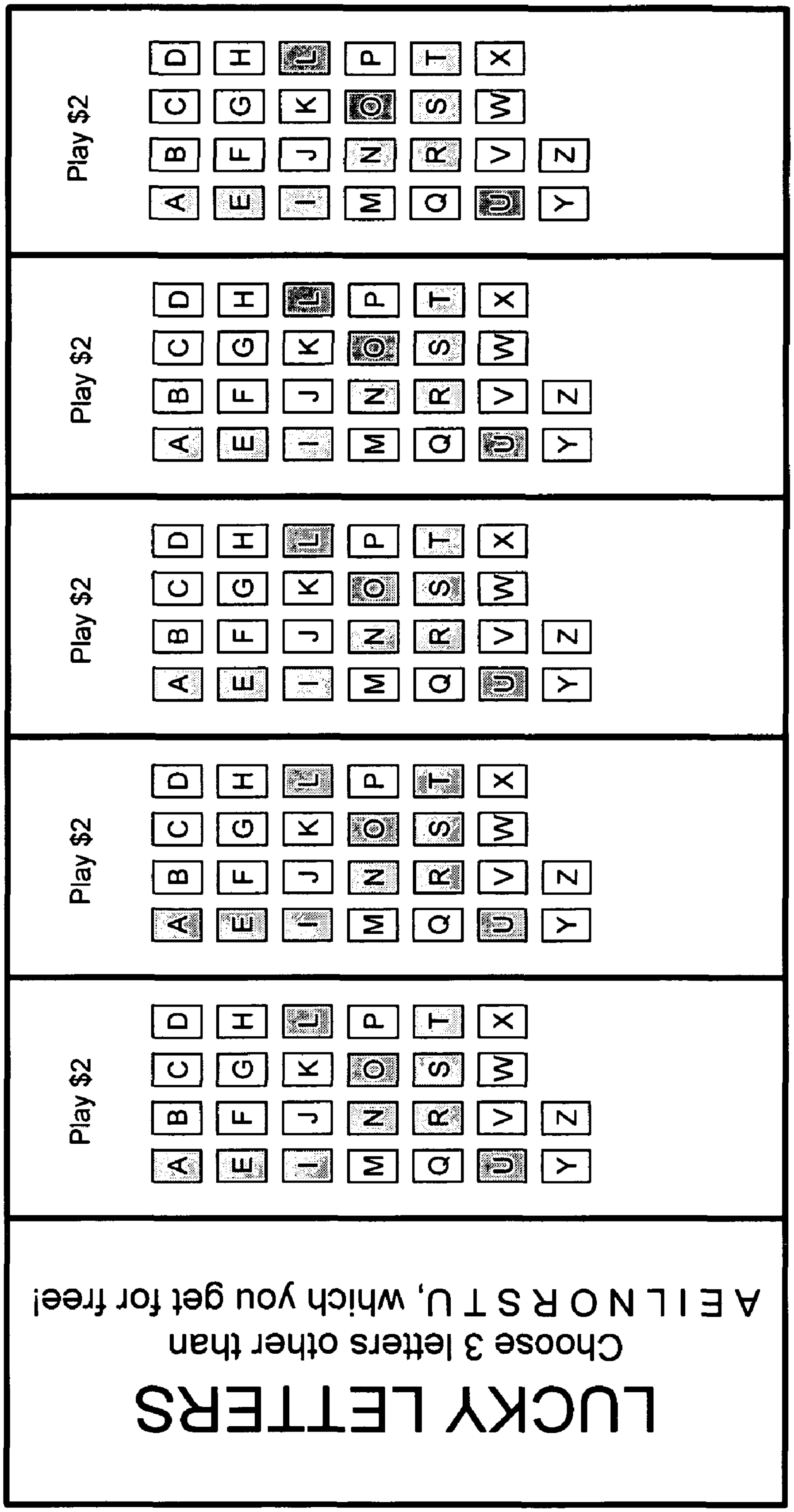
FIG. 13 is another embodiment of a playslip.
Figures 15, 17:
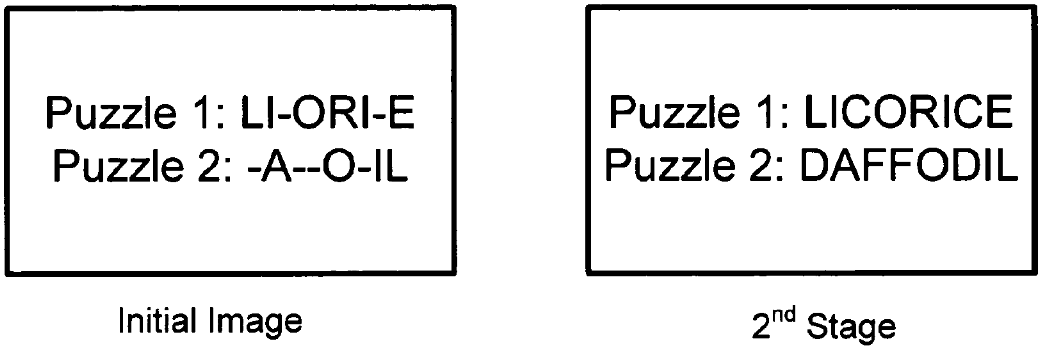
FIG. 15 is a display of a set of puzzles and their solutions.
FIG. 17 is an example of contributions toward different prize funds.

FIG. 13 illustrates another example of a playslip for this lottery game. Each board contains the letters of the alphabet. The letters that are given to the player, in this case (A, E, I, L, N, O, R, S, T, U) may either be omitted or shaded. The player selects 3 letters for from the remaining letters for each board chosen to play. The player's selection(s) is documented on a ticket as illustrated by FIG. 14.

The draw comprises an outcome randomly chosen from the pool of 360 sets of puzzles, subject to the probability distribution. The draw could be displayed in two stages. In the initial stage shown in FIG. 15, the puzzles with the letters missing would be displayed (on a television or monitor screen). This would be followed momentarily by a display of the completed puzzles.

Figure 16:
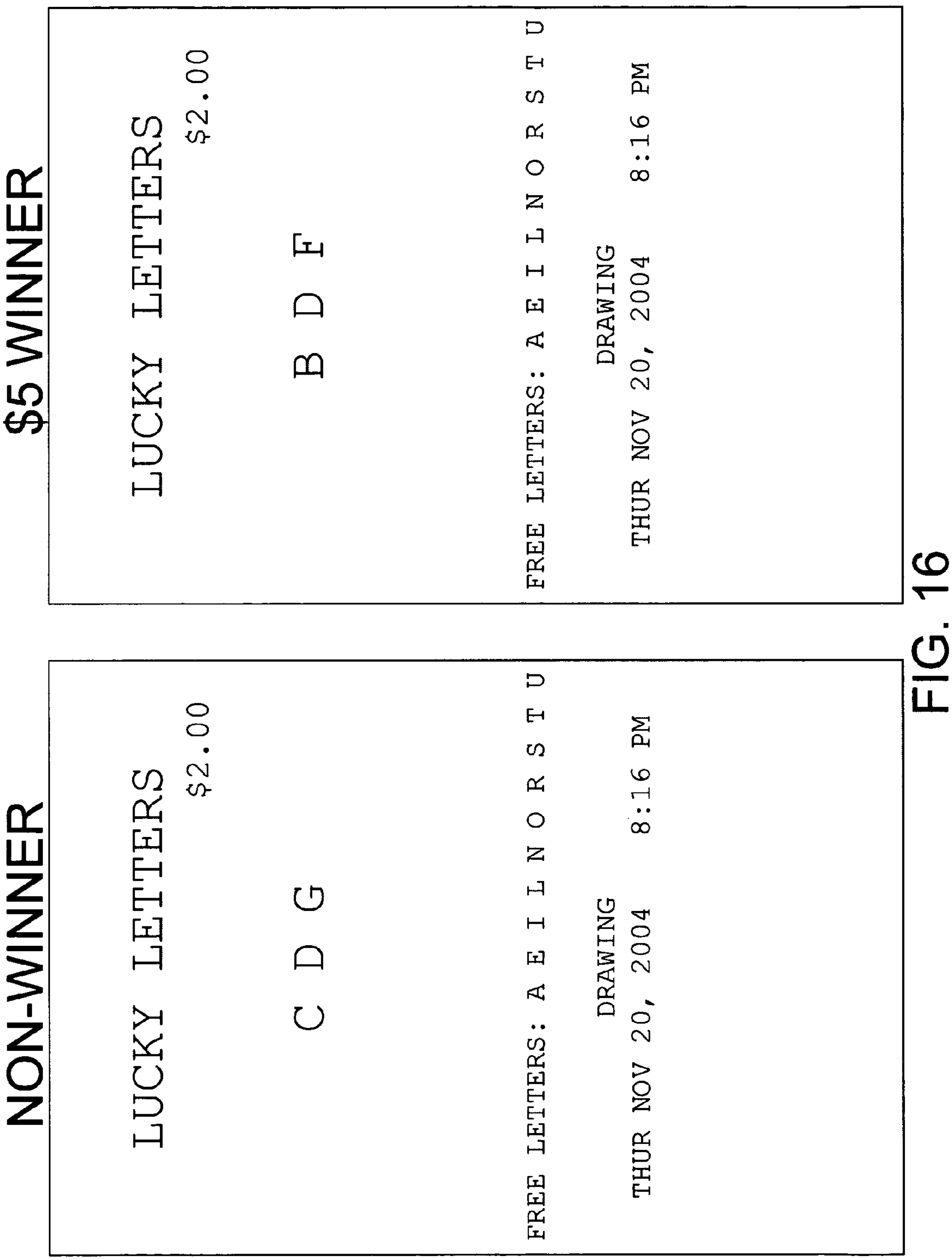
FIG. 16 illustrates a winning ticket and a losing ticket.

Once the draw has been conducted the prizes are determined according to the prize table (FIG. 12). FIG. 16 illustrates winning and losing tickets. If the draw is as in FIG. 15, the solution to Puzzle 1 is "C" and the solution to Puzzle 2 is "DF." The player selection for the "non-winner" ticket in FIG. 16 is "CDG." This selection solves Puzzle 1 as it contains the letter "C," but does not solve Puzzle 2 as it does not contain both "D" and "F." Since only Puzzle 1 is solved, by the prize table (FIG. 12), the player does not win a prize. The player selection for the "winning ticket" is "BDF." This selection does not solve Puzzle 1 as it does not contain the letter "C." This selection does solve Puzzle 2 as it contains the letters "D" and "F." By the prize table (FIG. 12), the player wins $5. It should be noted that the prizes for this game can be variable. For example, the prize for solving 2 puzzles in this implementation is a constant $100. It would be equivalent to allow this prize to vary such that the average value is $100. For example, the prize for solving 2 puzzles could be determined by a wheel that produces values between $20 and $500, whose average is $100.

In many lottery games, players have the option of allowing the lottery to randomly select or "quick pick" their choices in a lottery game. In the present embodiment, players may be offered a quick pick in the traditional manner, where all choices of three letters are possible, or they may be allowed to specify how many letters will be quick picked from each group. For example, the player may specify that two letters are to be selected from Class 1 and one letter is to be selected from Class 2.

While this embodiment describes a set-prize game, it is also possible to implement the present invention as a pari-mutuel game, i.e. one in which a percentage of sales is set aside for each prize level and winners at each level share the prize money equally. In doing so, it is desirable to allocate the prize money so that the actual prizes awarded will be, on average, at some predetermined level. In most traditional lottery games, this is a straightforward process, but in this invention the process is complicated by the fact that different player selections are not equally likely to win at the various levels, even though the return is 66.7% for all player selections. For example, if a player chooses three letters from Class 1, she will have a one in 28.7 chance of solving Puzzle 2 only and a one in 86.2 chance of solving both puzzles, whereas if she chooses three letters from Class 2, she will have a one in 4.4 chance of solving Puzzle 2 only and a one in 523.1 chance of solving both Puzzles. If money is allocated to prize levels purely as percentages of sales, there is risk that the prize amounts will be diluted. For example, if all players choose three letters from Class 1 and the prize money is not directed to the "both Puzzles" prize pool accordingly, the prize for solving both puzzles may be quite small, perhaps even smaller than the prize for solving Puzzle 2 only.

The following method may be used to avoid this situation. For each prize level, a target prize amount is selected. For example, say the prize for solving Puzzle 2 only is targeted to average $5 and the prize for solving both is targeted to average $100. Then for every ticket sold the amount contributed to each prize fund is the target prize amount times the probability that the ticket will earn that prize, given the player's selection. For the embodiment described above, this is summarized in the table in FIG. 17. This allocation method achieves the targeted average prize amounts regardless of the proportions in which players choose the four kinds of selections.

An implementation has been described where an outcome comprises a set of puzzles. More generally, an outcome could be thought of as a set of solutions to puzzles. That is, puzzles with the same solution are interchangeable. For a given solution there could be a pool of puzzles with that solution. FIG. 18 illustrates this concept. Displayed in FIG. 18 are the Group 1 Puzzles of FIG. 7 supplemented with more puzzles. For example, there are three puzzles with a solution of "B": "TU-A", "RA--IT" and "-OOT". Instead of a set of specific puzzles, an outcome would consist of a set of solutions that could be expressed by one or more sets of puzzles. FIG. 19 represents the probability distribution for the outcomes for the implementation described so far. Instead of specific puzzles, FIG. 19 identifies an outcome as a set of solutions. For example, "B, J" is assigned a probability of 0.03186%. "B, J" refers to any set of puzzles for which the solution to the first puzzle is "B" and the solution to the second puzzle is "J." FIG. 20 illustrates the sets of puzzles corresponding to "B, J." Any of these combinations could be used for the outcome "B, J." This interchangeability allows for a greater variety of content and quality control. For example, for aesthetics it may be desirable that the first puzzle contain fewer letters than the second. Outcomes that fit this criterion would be given priority.

The letter puzzles discussed so far have been words and phrases. However, a puzzle could consist of a single letter or group of letters devoid of context. For example, a puzzle could be a "lucky letter," simply a randomly selected letter. The player would be credited with that puzzle if his ticket contains the lucky letter. Similarly, a puzzle could comprise a random combination of 2 letters not related to a word or phrase. This contrivance could be useful in situations where there is insufficient natural content in the form of words and phrases.

The current invention does not have to be implemented by explicitly defining a probability distribution. A distribution could be "implied," i.e., by whatever method used, the outcomes occur with varying probabilities.

Multiple distributions could be used to manage the expected return. For example, there could be an embodiment that produces a 45% return and another that produces a 60% return to the players. The two embodiments could be weighted to produce a composite game that returns 50% to the players, i.e., an outcome could be drawn from either embodiment in proportion to produce the desired payout.

A special embodiment of this invention is one where all of the outcomes are equally likely. For example, the embodiment could be contrived where all of the puzzles had solutions consisting of one letter and there is exactly one puzzle for each letter. For example, there could be 26 puzzles starting with -PPLE ("A" for APPLE) through -EBRA ("Z" for ZEBRA). The player may be allowed to select 2 letters. In this case, puzzles could be randomly drawn as in a traditional lottery game. No player selection would have an advantage. The outcomes for this game would be the same. Nonetheless, this game would be consistent with the current invention as it can be described by a probability distribution for which all of the outcomes are equally likely.

As it has been discussed, draws for the current invention are random but the outcomes are not necessarily equal: the outcomes are subject to a probability distribution so that the payout is the same (or within an acceptable range) regardless of the player's selection. One method of effecting this type of draw is to conduct the draw in two phases: the first phase of the draw would be a multi-matrix game and the second phase of the draw a function would be randomly selected from a probability distribution of functions. "Multi-matrix" means permutations or combinations of objects are selected from two or more sets of objects. (A single set of objects could be considered a trivial case of a "multi-matrix.") Then a function is randomly selected subject to a probability distribution. Each function is such that it maps the result of the multi-matrix game from the first phase of the draw to an outcome.

FIG. 21 is a summary of an implementation of the current invention using this approach. The specifications are as follows. The wager is $2. The number of letters and the number of puzzles used is specified: The player will select 5 letters and the lottery will draw 4 puzzles. The given letters are indicated as A, E, I, L, N, O, R, S, T, U. The remaining letters are divided into two groups: matrix 1, comprising B, C, D, G, H, M, P, Y, and matrix 2, comprising F, J, K, Q, V, W, X, Z. Also indicated are functions assigned probabilities totaling to 1. The input for each of these functions consists of two permutations of letters. Permutation 1 is composed of letters from matrix 1 and is represented by variables $X_1$ through $X_5$. Permutation 2 is composed of letters from matrix 2 and is represented by variables $Y_1$ through $Y_5$. Each function maps these two permutations to an outcome consisting of a set of solutions to puzzles. Recall that an outcome for this game can be regarded as a set of solutions for puzzles. The actual words or phrases that have those solutions and are displayed to the players are incidental as far as the underlying game mechanics are concerned.

FIG. 22 illustrates a draw. For the first phase of the draw the permutation GDBYP is randomly selected from matrix 1 and the permutation KQFJZ is randomly selected from matrix 2. For the second phase of the draw function 2 as described in FIG. 21 is randomly selected subject to the probability distribution. Once the permutations and the function have been selected the permutations are taken as input to the function. To evaluate the function, the letters are identified with the variables. G is identified with $X_1$, D is identified with $X_2$, B is identified with $X_3$, Y is identified with $X_4$, P is identified with $X_5$, K is identified with $Y_1$, Q is identified with $Y_2$, F is identified with $Y_3$, J is identified with $Y_4$, and Z is identified with $Y_5$. Substituting letters for the variables we get the outcome: puzzle 1: G, puzzle 2: DK, puzzle 3: BQ, and puzzle 4: GDB. To produce actual puzzles with these solutions there is a table in a database (FIG. 23) that correlates every possible solution to one or more words and/or phrases for which the given solution comprises the missing letters, i.e. letters other than those given (A, E, I, N, O, R, S, T, U). For example, the solution to puzzle 1 is G. The database is interrogated for a puzzle. Looking up G in the table (FIG. 23), it is correlated to the word GREEN. G is the only letter in GREEN that is not given Similarly, interrogating the database for puzzles 2, 3, and 4 we get puzzle 2 is DESK, puzzle 3 is BANQUET, and puzzle 4 is BADGE. These puzzles could be displayed to the player with placeholders (e.g. dashes) replacing the letters in the solution, e.g. puzzle 1: -REEN, puzzle 2: -ES-, puzzle 3: -AN-UET, puzzle 4: -A--E.

The probabilities assigned to each of the functions must be such that the return for any player selection is the same. We describe how these probabilities and the consequent return are computed using linear algebra.

FIG. 28 illustrates the returns for the various player selections expressed as linear combinations of weights on the outcomes. FIG. 29 is a system of constraints for the weights on the outcomes and overall return on a game.

The range of each function comprises the set of every possible outcome that can be attained by inputting permutations. FIG. 30 illustrates the number of winning outcomes associated with each of these functions. For example, those skilled in the art of Mathematics can verify that there are 6,720 different outcomes produced by function 1. Let $P_1$, $P_2$, $P_3$, $P_4$, $P_5$, and $P_6$ be the probabilities assigned to these 6 functions. The return for any player selection can be expressed as a linear combination of these probabilities.

As an example, consider BCDFJ, comprising 3 letters from matrix 1 and 2 from matrix 2 in FIG. 31. The return for this selection can be expressed as follows: FIG. 31 illustrates the counts of the outcomes corresponding to the 6 functions that confer BCDFJ a winner. For example, 360 of the outcomes of function 1 are such that BCDFJ wins $10. This information can be used to compute probabilities. (For example, there 6,720 outcomes for function 1, 360 of which are such that BCDFJ wins $10. Therefore, given an outcome from function 1, the probability that BCDFJ wins $10 is 360/6,720.) As there are 3 different prizes to consider, $10, $50, $500, the return for BCDFJ on a $2 wager is:

$$10\times(\text{probability } BCDFJ \text{ wins } \$10)/2+50\times(\text{probability } BCDFJ \text{ wins } \$50)/2+500\times(\text{probability } BCDFJ \text{ wins } \$500)/2=10\times(360P_1/6{,}720+1{,}080P_2/18{,}816+1{,}440P_3/13{,}440+2{,}232P_4/18{,}816+5{,}380P_5/13{,}440+360P_6/1{,}680)/2+50\times(144P_2/18{,}816+60P_3/13{,}440+144P_4/18{,}816)/2+500\times(12P_2/18{,}816)/2=0.267857P_1+0.637755P_2+0.647321P_3+0.784439P_4+0.513393P_5+1.071429P_6$$

The linear combination has been derived that expresses the return for the case for which there are 3 letters from matrix 1 and 2 letters from matrix 2, as represented by player selection BCDFJ. The other cases are derived similarly. In total, there are 6 cases: 5 letters from matrix 1; 4 letters from matrix 1 and 1 from matrix 2; 3 from matrix 1 and 2 from matrix 2; 2 from matrix 1 and 3 from matrix 2; 1 from matrix 1 and 4 from matrix 2; and 5 from matrix 2. The linear combinations that express the return for each of these cases is indicated in FIG. 28, respectively.

The probabilities should be such that the return is the same for all player selections. That is, there is a number R such that the constraints in FIG. 32 hold. Using linear algebra, a solution to these constraints is $P_1$=0.119%, $P_2$43.994%, $P_3$=12.454%, $P_4$35.832%, $P_5$=5.677%, $P_6$=1.924%, and R=69.23%. That is, given this probability distribution for the functions in FIG. 26, each player selection yields a 69.23% return on a $2 wager. FIG. 33 illustrates the system of constraints for the weights on functions used in the draw and the overall return on a game The puzzles for this game can be displayed in a variety of ways. At the time of draw the outcome could be displayed as in FIG. 24. Initially, only the given letters are concealed. The missing letters are supplied (e.g. one puzzle at a time). Finally, the completed puzzles are displayed. Alternatively, the puzzles could initially be displayed with none of the letters exposed, as in FIG. 25. All of the letters would be eventually revealed to the completed puzzles.

Figure 26:
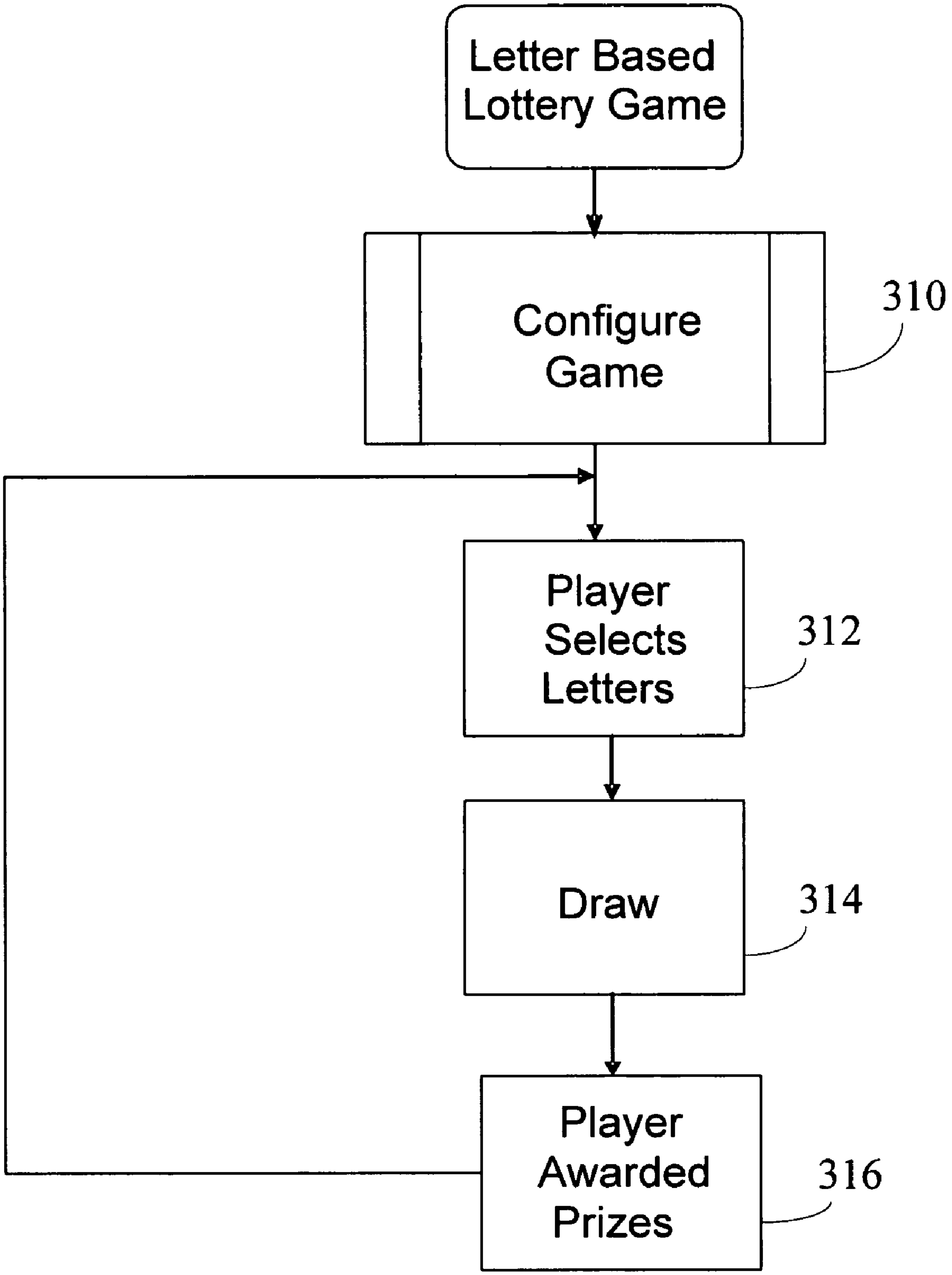
FIG. 26 is a flow chart for configuring a game.
Figure 27:
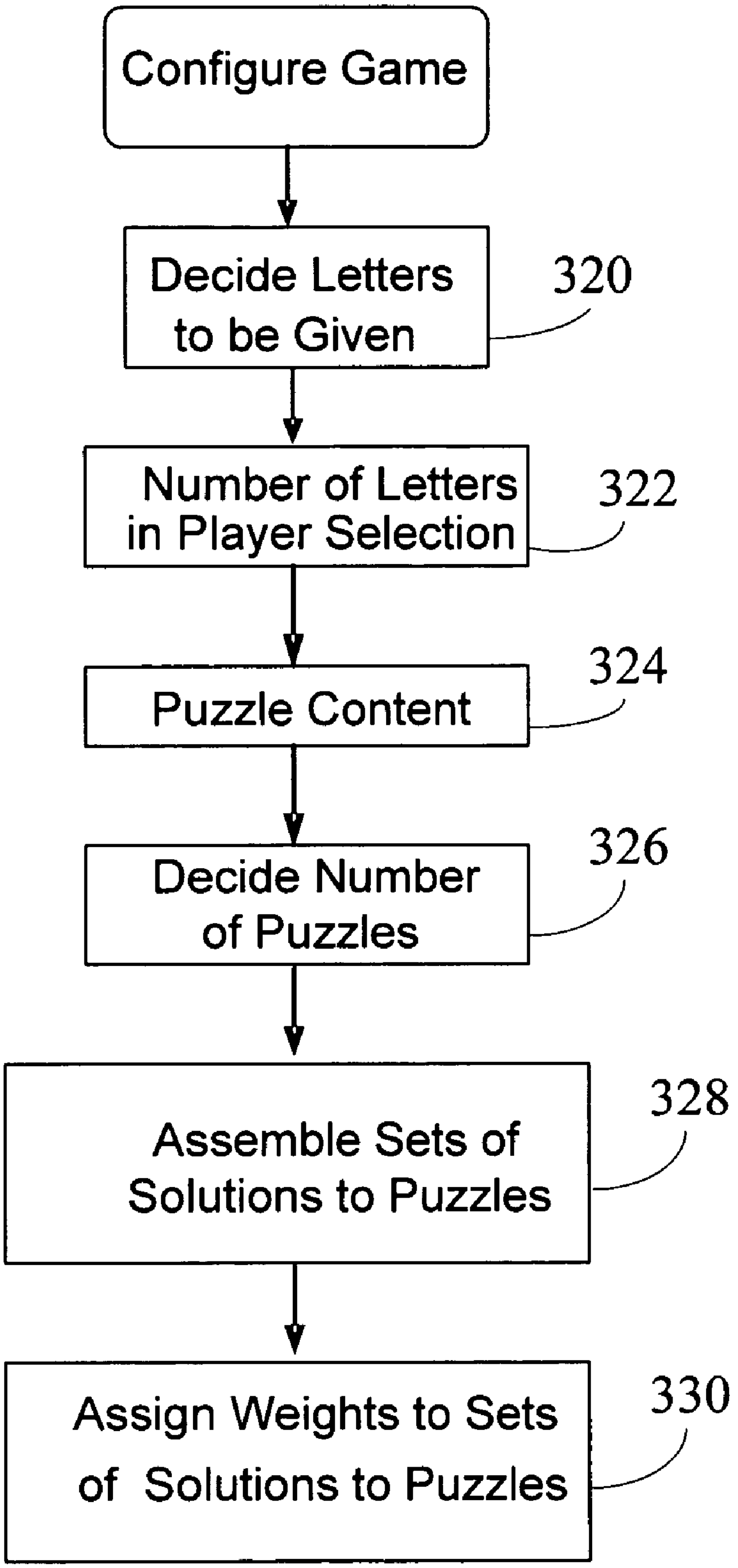
FIG. 27 is an expansion of the flowchart of FIG. 26.

One embodiment for implementing this invention is summarized in the flowcharts shown in FIGS. 26 and 27. First, the game must be configured (block 310, FIG. 26 expanded in FIG. 27). It must be decided what letters to give to the player (block 320, FIG. 27). For example, in the embodiment described in FIGS. 21-25, the letters A E I L N O R S T U are given to the player. The player will be allowed to use these letters to solve the puzzles in addition to whatever letters he selects.

It must be decided how many letters the player can select (block 322, FIG. 27). For example, in the embodiment described in FIGS. 21-25, the player selects 5 letters from those letters that are not given. The content of the puzzles must be decided (block 324, FIG. 27). Words and/or phrases must be assembled that the lottery deems appropriate. FIG. 23 illustrates the content for the puzzles for the embodiment described in FIGS. 21-25. It must also be decided the number of puzzles per game (block 326, FIG. 27). In the embodiment in FIGS. 21-23, there are 4 puzzles per game.

Sets of solutions to puzzles are assembled such that for any solution within a set, there is a corresponding puzzle with that solution (block 328, FIG. 27). In the embodiment illustrated in FIG. 21, sets of solutions to puzzles are determined by functions that take as input permutations of letters. Each function outputs a set of solutions to puzzles. For example, it is described above how the set of solutions (G, DK, BQ, GDB) is produced by function 2. (G, DK, BQ, GDB) represents any set of puzzles for which G, DK, BQ, and GDB are the solutions. Those skilled in the art of Mathematics can confirm that there are actually 18,816 groups of puzzles represented by function 2.

Once the groups of solutions to puzzles have been determined, each group must be assigned weight in such a way as to return a constant payout to the players regardless of the player selection. For example, in the embodiment in FIG. 21, function 2 has been assigned 43.994%. As there are 18,816 sets of solutions to puzzles that can be produced by function 2, and each set equally likely, such a set would be effectively assigned a weight of 0.002338116%=43.994%/18,816. As discussed above, this weighting is accomplished using techniques of linear algebra and results in a game for which the return is the same for every player selection.

Once the game has been configured, a player enters the game by selecting or having quick-picked a set of letters (block 312, FIG. 26) the same way in which he would select a set of numbers in traditional lottery game. The lottery conducts a draw by selecting a set of solutions to puzzles (block 314, FIG. 26). This could be done directly by using a random number generator to select a particular set subject to its assigned weight. The draw could take place in steps. For example, in FIG. 21 the groups of puzzles are represented by functions taking as input permutations of letters. The draw could consist of randomly selecting the permutations to be taken as input to a function, and then selecting the function based on its assigned weight. For example, in FIG. 21, function 2 would be chosen 43.994% of the time and the input to the function would be randomly selected permutations.

Once a set of solutions has been determined, a set of letter puzzles that have these solutions must be selected. This may be accomplished by querying a database. Given any solution, there is one or more letters puzzles stored in the database that has that solution. A letter puzzle from among those having that particular solution may be selected at random or it may be chosen for quality control. For example, it may be desirable for a series of puzzles to be of increasing lengths. It might be possible to accomplish this in the way in which puzzles are queried in the database.

Once the draw has been conducted, that is, a group of puzzles has been selected, the player wins prizes based on which and/or the number of puzzles he is able to solve with his letters and the given letters (block 316, FIG. 26).

While the present invention has been shown and described in several embodiments, it is to be appreciated that certain changes can be made in the systems and methods without departing from the spirit and scope of the invention as set forth in the Claims appended herewith.

What is claimed is:

1. A method for playing a lottery game, comprising the steps of:

presenting a group of revealed characters to a player and subsequently accepting an electronic, oral, or playslip entry from the player composed of a set of characters chosen by the player from the group of characters such that the player has full knowledge of the distinctions between the characters and selects particular desired characters from the group of characters to be included in their entry;

after the player has made their entry, issuing a ticket to the player that reflects their entry and drawing a set of at least two puzzles from a database, wherein one of the puzzles is drawn from a first group of puzzles each having a solution derived from a first subset of characters from the group of characters, and the other puzzle drawn from a second group of puzzles each having a solution that is derived from a second different subset of characters from the group of characters, the probability of solving the puzzle from the first group of puzzles being different than the probability of solving the puzzle from the second group of puzzles, wherein in each drawn puzzle, a subset of characters that is less than the total number of characters in the completed puzzle is missing and constitutes the solution to each puzzle;

displaying each of the drawn puzzles to the player via a screen, monitor, or paper ticket;

in the same single play of the lottery game, comparing the set of characters chosen by the player with each puzzle to determine if the entry solves that puzzle, wherein an entry solves a puzzle if the entry contains the missing characters for that puzzle;

determining if the entry is the winning entry based upon if the entry solves one or more of the drawn puzzles; and awarding a prize to a winning entry based on the number or combination of solved drawn puzzles.

2. The method of claim 1, wherein there is a probability distribution such that the return to the player is the same for all entries.

3. The method of claim 1, wherein the characters are letters and the step of drawing further comprising the steps of:

selecting a first set of letters as the solution for the puzzles in the first group of puzzles, and selecting a different second set of letters as the solution for the puzzles in the second group of puzzles; and retrieving a puzzle from each group of puzzles from a database.

4. The method of claim 3, wherein the step of selecting sets of letters further comprising the steps of:

randomly selecting permutations from groups of letters;

randomly selecting a function subject to a probability distribution;

taking as input to the function the permutations of letters; and the function outputting sets of letters.

5. The method of claim 1, wherein the step of drawing occurs at predetermined intervals and the drawn set of puzzles applies to a group of entries.

6. The method of claim 1, wherein the step of drawing occurs instantly and applies to an individual player.

7. The method of claim 6, wherein the drawn set of puzzles is on a paper ticket.

8. The method of claim 6, wherein the drawn set of puzzles is disclosed electronically.

9. A method for playing a lottery game, comprising the steps of:

revealing a group of letters to a player and subsequently receiving a paper, oral, or electronic game entry from the player at a game station, the game entry having a plurality of letters chosen by the player from the group of letters which were revealed to the player such that the player has full knowledge of the different letters in the group and selects particular desired letters from the group to be included in their entry, the player's game entry reflected on a ticket that is issued to the player;

after the player has made their entry, a set of puzzles being produced from a database and displayed on a monitor or screen at the game station or a ticket produced at the game station, each puzzle being produced from a different respective group of puzzles wherein the solution to the puzzles in a first group is derived from a first subset of letters, and the solution to the puzzles in a second group is derived from a second different subset of letters, and the puzzles presented to the player wherein less than all of the letters from the completed puzzle are missing and constitute the solution to the puzzle;

in the same single play of the lottery game, comparing the letters chosen by the player against the produced puzzles;

determining if the game entry is a winning entry based upon the entry solving one or more puzzles by containing the missing letters for certain or enough puzzles.

10. The method of claim 9, wherein the set of puzzles being produced and displayed step of drawing occurs at predetermined intervals.

11. The method of claim 9, wherein the set of puzzles being produced and displayed occurs instantly and applies to an individual player.

12. The method of claim 9, wherein the set of puzzles is disclosed on the ticket that reflects the player's game entry.

13. The method of claim 9, wherein the set of puzzles is displayed at the game station.

* * * * *